US007486589B2

(12) United States Patent
Lee et al.

(10) Patent No.: US 7,486,589 B2
(45) Date of Patent: Feb. 3, 2009

(54) METHODS AND APPARATUS FOR PREDICTING THE HYDROCARBON PRODUCTION OF A WELL LOCATION

(75) Inventors: Donald W. Lee, Houston, TX (US); Lennert D. den Boer, Calgary (CA); Colin M. Sayers, Katy, TX (US); Patrick J. Hooyman, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 91 days.

(21) Appl. No.: 11/350,639

(22) Filed: Feb. 9, 2006

(65) Prior Publication Data

US 2007/0183260 A1 Aug. 9, 2007

(51) Int. Cl.
    *G01V 1/50* (2006.01)
(52) U.S. Cl. ...................................................... 367/35
(58) Field of Classification Search ................... 367/35, 367/83; 181/105
    See application file for complete search history.

(56) References Cited

U.S. PATENT DOCUMENTS

| 3,739,871 | A | * | 6/1973 | Bailey ............................ 367/37 |
| 3,740,641 | A |   | 6/1973 | Hwang et al. |
| 4,220,205 | A | * | 9/1980 | Coursen et al. .............. 166/299 |
| 4,280,200 | A | * | 7/1981 | Silverman ..................... 367/37 |
| 4,442,895 | A | * | 4/1984 | Lagus et al. ............. 166/250.1 |
| 4,638,254 | A | * | 1/1987 | Uhri ............................ 324/323 |
| 4,749,038 | A | * | 6/1988 | Shelley .................... 166/250.1 |
| 4,802,144 | A | * | 1/1989 | Holzhausen et al. ........... 367/35 |
| 5,010,527 | A | * | 4/1991 | Mahrer ......................... 367/86 |
| 5,472,049 | A | * | 12/1995 | Chaffee et al. ........... 166/250.1 |
| 5,671,136 | A |   | 9/1997 | Willhoit, Jr. |
| 5,711,376 | A | * | 1/1998 | Sydansk .................. 166/308.6 |
| 5,771,170 | A | * | 6/1998 | Withers et al. ................ 702/16 |
| 5,963,508 | A | * | 10/1999 | Withers ........................ 367/38 |
| 6,049,508 | A | * | 4/2000 | Deflandre .................... 367/48 |

(Continued)

FOREIGN PATENT DOCUMENTS

WO    WO 00/16126    3/2000

(Continued)

OTHER PUBLICATIONS

Bai, T., D. D. Pollard, and M. R. Gross (2000), Mechanical prediction of fracture aperture in layered rocks, J. Geophys. Res., 105(B1), 707-721 Obtained from: http://www.agu.org/pubs/crossref/2000/1999JB900303.shtml Downloaded on May 22, 2008.*

(Continued)

*Primary Examiner*—Jack W Keith
*Assistant Examiner*—Ari M. Diacou
(74) *Attorney, Agent, or Firm*—Robert P. Lord; Dona C. Edwards; Bryan P. Galloway (57) ABSTRACT

Methods and apparatus that use microseismic event data, stress data, seismic data, and rock properties to predict the hydrocarbon production success of a well location are disclosed. An example method generates a hydrocarbon production function based on information associated with at least a first well location, obtains information associated with a second well location, and calculates the hydrocarbon production function using the information associated with the second well location to predict the hydrocarbon production of the second well location.

25 Claims, 6 Drawing Sheets

U.S. PATENT DOCUMENTS

| | | | |
|---|---|---|---|
| 6,581,686 B2* | 6/2003 | Armatage | 166/252.6 |
| 6,904,366 B2* | 6/2005 | Patzek et al. | 702/13 |
| 6,947,843 B2 | 9/2005 | Fisher et al. | |
| 6,985,816 B2* | 1/2006 | Sorrells et al. | 702/14 |
| 7,028,772 B2* | 4/2006 | Wright et al. | 166/250.01 |
| 7,054,752 B2* | 5/2006 | Zabalza-Mezghani et al. | 702/13 |
| 7,248,969 B2* | 7/2007 | Patzek et al. | 702/13 |
| 2003/0098149 A1* | 5/2003 | Wellington et al. | 166/52 |
| 2003/0112704 A1 | 6/2003 | Goff et al. | |
| 2004/0244972 A1* | 12/2004 | Sayers et al. | 166/250.15 |
| 2004/0254734 A1* | 12/2004 | Zabalza-Mezghani et al. | 702/13 |
| 2006/0092766 A1 | 5/2006 | Shelley et al. | |
| 2006/0095240 A1* | 5/2006 | Elisabeth et al. | 703/10 |
| 2006/0283589 A1* | 12/2006 | Sayers | 166/254.1 |
| 2007/0038377 A1* | 2/2007 | Sayers et al. | 702/9 |
| 2007/0183260 A1* | 8/2007 | Lee et al. | 367/25 |

FOREIGN PATENT DOCUMENTS

| | | |
|---|---|---|
| WO | WO 00/58756 | 10/2000 |

OTHER PUBLICATIONS

Steve Ahlgren, Jim Holmlund, Paul Griffiths, and Rob Smallshire. Fracture Models and Fractured Reservoirs. Search and Discovery Article #40100 (2003). Obtained from: http://www.searchanddiscovery.net/documents/geophysical/2003/ahlgren02/images/ahlgren02.pdf Downloaded on May 22, 2008.*

P. Kaiser et al., "Contribution to the Valuation of Microseismic monitoring Data recorded from Treatment Well-Results based on 20 Hydro-fracturing Jobs recorded from Treatment Well," *SPE 88695*, Abu-Dhabi Int'l Petroleum Exh. & Conference, Abu Dhabi UAE, Oct. 10-13, 2004.

L.E. East Jr. et al., "Successful Application of Hydrajet Fracturing on Horizontal Wells completed in a Thick Shale Reservoir," SPE 91435, Eastern Regional Meeting, Charleston WV, Sep. 15-17, 2004.

PCT International Search Report, Oct. 22, 2007, 7 pages.

Vogel A., Amirijafari B: "Predicting Possibility of Oil Production From Tar Sand Deposits Based on Geologic, Logging, and Chemical Composition" SPE, Society of Petroleum Engineers, May 19, 1982, pp. 1-15.

Wu Yafei, George A. McMechan, "Estimation of fracture height using microseismicity associated with hydraulic fracturing" Geophysics, Seg., vol. 63, No. 3, May 1998, pp. 908-917.

Urbancic T.I., Rutledge J.: "Using Microseismicity to Map Cotton Valley Hydraulic Fractures" SEG Expanded Abstracts 19, 1444, 2000, pp. 1-5.

Sun Y.F., Goldberg D.: "Effects of aspect ratio on wave velocities in fractured rocks" SEG, Expanded Abstracts 16, 925, 1997, pp. 925-928.

Kozlov E.A.: "Pressure-defendant seismic response of fracture rock" Geophysics, SEG., vol. 69, No. 4, Jul. 2004, pp. 885-897.

Spencer T.W., Chi H.C.: "Thin-layer fracture density" Geophysics, SEG, vol. 56, No. 6, Jun. 1991, pp. 833-843.

Schrader S.M., Balch R.S., Ruan T.: "Using Neural Networks to Estimate Monthly Production: A Case Study for the Devonian Carbonates, Southeast New Mexico" SPE, Society of Petroleum Engineers, Apr. 17, 2005, pp. 1-5.

* cited by examiner

Stress anisotropy

- Low stress anisotropy
- Lower seismic anisotropy
- Wide fracture fairway

- High stress anisotropy
- Higher seismic anisotropy
- Narrow fracture fairway

METHODS AND APPARATUS FOR PREDICTING THE HYDROCARBON PRODUCTION OF A WELL LOCATION

FIELD OF THE DISCLOSURE

The present disclosure relates generally to predicting the hydrocarbon production success of a well location and, more specifically, to methods and apparatus that use microseismic event data, information on in-situ stress, and rock properties to predict the hydrocarbon production success of a well location and stimulation (e.g., due to a hydraulic fracture).

BACKGROUND

The collection and analysis of microseismic events associated with hydrofracturing a well to improve production or due to production from reservoirs are generally well known. Such microseismic events are essentially small earthquakes (e.g., having a Richter magnitude of less than three) that result from stress changes within the geological structures associated with a well or reservoir. Typically, these stress changes are induced during the extraction or injection of fluids into the well or reservoir. More specifically, the anisotropic nature of earth stresses within a reservoir results in the accumulation of shear stresses on geological structures such as faults, fractures, etc. These accumulated shear stresses are often released during depletion (e.g., extraction processes) and stimulation (e.g., during hydraulic fracture stimulation) operations. The release of these shear stresses results in the emission of acoustic energy or sound that can be detected by devices such as, for example, geophones, accelerometers, etc., and analyzed to determine certain physical characteristics of the well and/or reservoir.

Some past efforts have attempted to analyze microseismic data to optimize well placement and to predict well performance. In particular, some of these efforts have focused on identifying the locations of microseismic events to map fractures to enable the prediction of well performance and/or optimize well placement. For example, microseismic data may be analyzed to determine fracture orientation, extent or size, and estimated growth, all of which are factors that affect optimal well placement and, ultimately, well production or performance. One such effort is described in Society of Petroleum Engineers (SPE) paper number 88695, entitled "Contribution to the Valuation of Microseismic Monitoring Data Recorded from Treatment Well—Results Based on 20 Hydrofracturing Jobs Recorded From Treatment Well," by Kaiser et al., the disclosure of which is incorporated by reference herein in its entirety.

Other efforts have focused on using microseismic event data to improve hydraulic fracture stimulation of a reservoir to thereby increase the productivity of the associated well(s). One such effort is described in SPE paper number 91435, entitled "Successful Application of Hydrajet Fracturing on Horizontal Wells Completed in a Thick Shale Reservoir," by East et al., the disclosure of which is incorporated by reference herein in its entirety.

While the above-noted uses of microseismic data have focused on determining the spatial characteristics of reservoirs (e.g., fracture location, orientation, extent, etc.), still other efforts have attempted to use microseismic event data to estimate reservoir properties such as, for example, porosity, permeability, fluid saturation, stress, seismic velocity, and rock strength. In addition to spatial characteristics, these other reservoir properties may be useful to control fluid extraction from a reservoir and/or to plan production and/or development of fields. An example system that processes microseismic signals to estimate reservoir properties as noted above is described in U.S. Pat. No. 6,947,843, the entire disclosure of which is incorporated by reference herein in its entirety.

SUMMARY

In accordance with one disclosed aspect, a system and method of predicting a hydrocarbon production of a well location generates a hydrocarbon production function based on information associated with at least a first well location, obtains information associated with a second well location, and calculates the hydrocarbon production function using the information associated with the second well location to predict the hydrocarbon production of the second well location.

In accordance with another disclosed aspect, a system and method of estimating a fracture volume obtains a set of microseismic data associated with a fracture, generates a voxelized space based on the set of microseismic data, and selects pairs of points from the set of microseismic data. Additionally, the system and method identifies voxels from the voxelized space, wherein the identified voxels correspond to the pairs of points and vectors connecting the pairs of points, and estimates the fracture volume based on the identified voxels.

In accordance with still another disclosed aspect, a system and method of estimating an aspect ratio of a fracture associated with a geological area computes a stress ratio associated with the fracture, and maps the stress ratio to an estimated aspect ratio via a predetermined relationship relating stress ratios to aspect ratios for the geological area

DETAILED DESCRIPTION

In general, the example methods, apparatus, and articles of manufacture described herein use rock properties, stress and microseismic event data or information collected, for example, during a hydraulic fracture treatment to predict or estimate the hydrocarbon production success of a well location (e.g., a location that may be drilled). More specifically, the methods, apparatus, and articles of manufacture described herein determine geomechanical, petrophysical, and/or other rock properties that govern hydrocarbon production for a horizon, field, or geological area (e.g., a basin), and then use the results to predict the productivity of well locations for future wells.

In the examples described herein, a hydrocarbon production function or model is determined or generated by fitting data associated with geomechanical, petrophysical, and/or other rock properties for one or more operating or existing wells to the actual hydrocarbon production of those operating wells. The operating or existing well(s) used to determine or generate the hydrocarbon production function may be associated with a particular geological area (e.g., a basin). In this manner, the hydrocarbon production of a location to be drilled in the geological area to which the hydrocarbon production function applies can be estimated by collecting geomechanical, petrophysical, and/or other rock property information for the to be drilled location and using this collected data in conjunction with the hydrocarbon production function to estimate or predict the hydrocarbon production of the to be drilled location. As described in greater detail below, some of the parameters used to determine and/or calculate the example hydrocarbon production function described herein may be determined using microseismic data, seismic data, log data, etc.

Before discussing the example methods in detail, it should be recognized that the example methods or processes described herein may be implemented as machine readable and executable instructions, code, software, etc. stored on a tangible medium such as, for example, a magnetic, solid state, and/or optical medium and executable by, for example, a controller, microprocessor, etc., such as the example processor system 800 of FIG. 8 described in greater detail below. Further, some or all of the operations associated with the example methods described herein may be executed manually and/or the order of the operations may be varied or eliminated to achieve the same or similar results.

The example methods may be described in conjunction with flow diagrams, which may be representative of example machine readable and executable instructions, software, or code. Such machine readable instructions, software, or code may comprise a program for execution by a processor such as the processor 812 shown in the example processor system 800 of FIG. 8. The program may be embodied in software stored on a tangible medium such as a CD-ROM, a floppy disk, a hard drive, a digital versatile disk (DVD), or a memory associated with the processor 812 and/or embodied in firmware and/or dedicated hardware in a well-known manner. Additionally or alternatively, the example methods may be implemented using any desired combination of hardware, firmware, and/or software. For example, one or more integrated circuits, discrete semiconductor components, or passive electronic components may be used to perform the operations represented in the flow diagrams.

Figure 1:
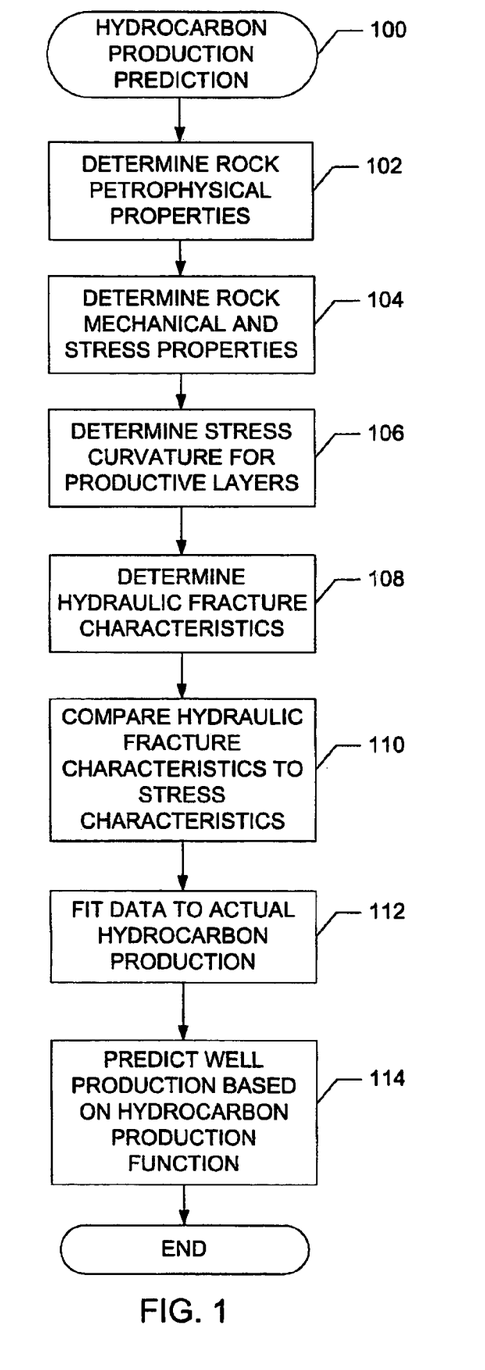
FIG. 1 is a flow diagram representing an example process to predict the hydrocarbon production of a well location.
Figure 2:
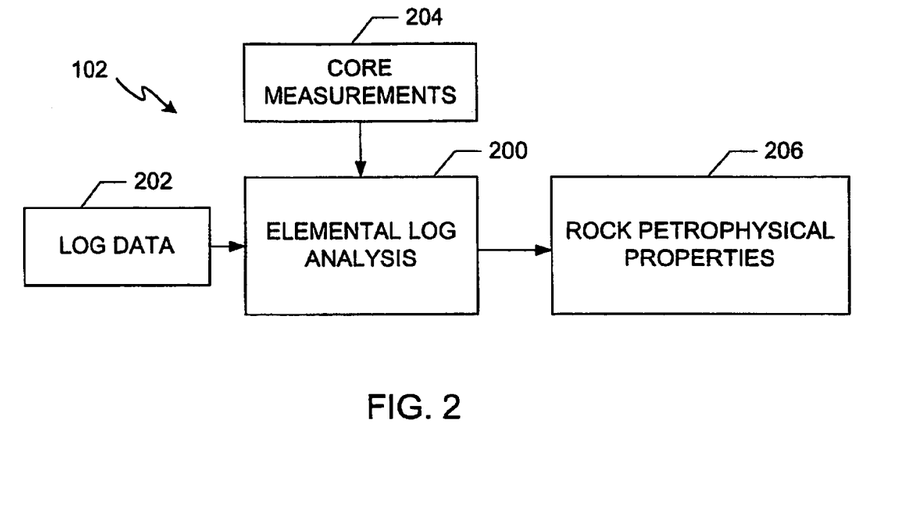
FIG. 2 represents an example manner in which rock petrophysical properties may be determined in the example process of FIG. 1.

Now turning to FIG. 1, a flow diagram representing an example process 100 to predict the hydrocarbon production of a well location is shown. The example prediction process 100 begins by determining rock petrophysical properties using log data, which may be calibrated with core measurements (block 102). In general, the petrophysical properties determined at block 102 are related to the hydrocarbon production potential of the rock. As depicted in FIG. 2, the operations at block 102 may be carried out using an elemental log analysis 200, which may be more commonly referred to as ELAN™ (which is a mark of Schlumberger), to determine what type of hydrocarbon is present in the pore space of the rock, how much hydrocarbon is present in the pore space of the rock, and in what pore space the hydrocarbon is located. As is known, an elemental log analysis separates the minerals, porosity and saturation of hydrocarbon for a volume of rock using log data 202 as inputs and core measurements 204 as calibration points. The elemental log analysis 200 then outputs rock petrophysical properties 206 such as, for example, porosity, mineral volumes, hydrocarbon saturation, organic carbon content, etc. As is known, the log data 202 may be collected using one or more probes and/or other tools, sensors, etc. disposed within one or more well borehole(s) and the core measurements 204 may be made under laboratory conditions using core samples obtained during the drilling of the well(s). The core measurements 204 provide certain rock properties at known depths within the well and, thus, can be used in known manners to better evaluate the rock properties associated with log data collected at different depths (e.g., deeper) in the well.

Returning to FIG. 1, following the determination of the rock petrophysical properties at block 102, the example process 100 determines rock mechanical and stress properties (block 104). While a number of techniques can be used to determine the rock mechanical and stress properties for a particular well, the operations associated with block 104 may be advantageously carried out using a mechanical earth modeling technique such as that shown in FIG. 3.

Figure 3:
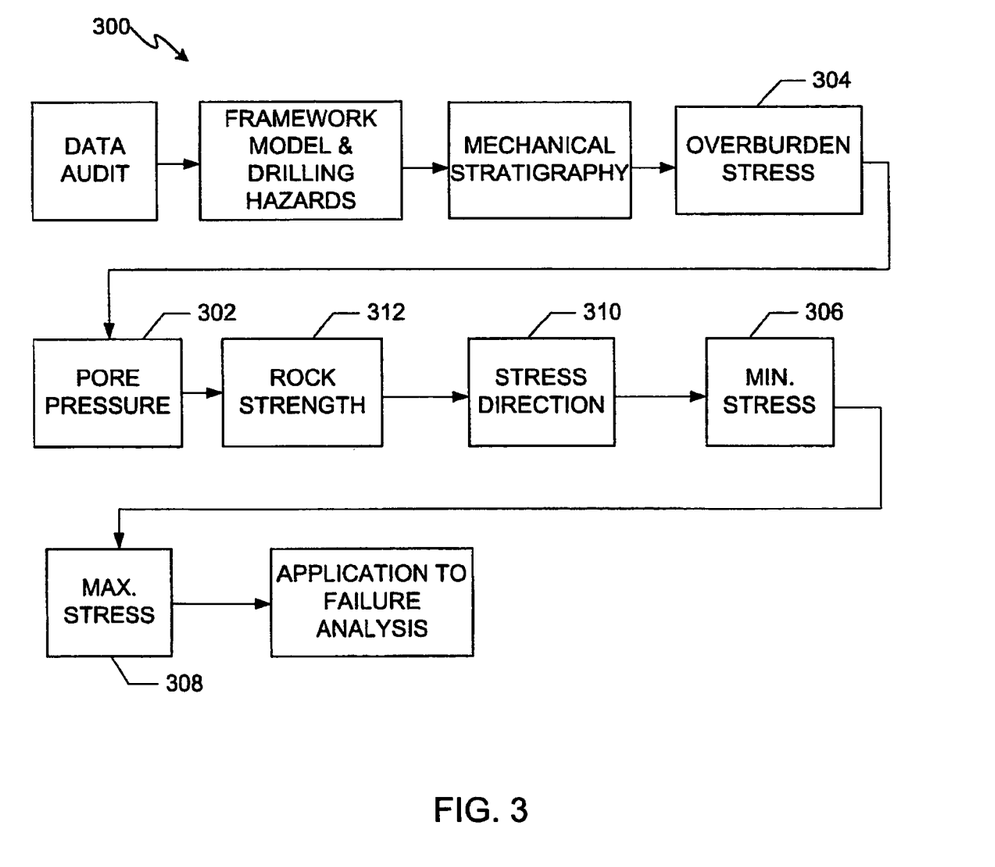
FIG. 3 represents an example manner in which rock mechanical and stress properties may be determined in the example process of FIG. 1.

The earth modeling technique 300 depicted in FIG. 3 is a well-known technique developed by Schlumberger Technology Corporation. More detailed information describing earth modeling techniques are disclosed in U.S. Pat. Nos. 6,549,854 and 6,766,354, both of which are incorporated herein by reference in their entireties. In general, the earth modeling technique 300 enables the generation of a one dimensional mechanical earth model for the field associated with the well under analysis. The one dimensional earth model may be used to evaluate rock mechanical and stress properties at the well borehole. In combination with seismic data, a three dimensional mechanical earth model covering the area of interest may also be generated and populated with well data and seismic data using geostatistical techniques such as, for example, kriging. Such a three dimensional earth model can be particularly useful to predict the expected production and performance of stimulation treatments at locations for which there is no well information. More specifically, the model includes earth stresses or stress profiles such as the pressure of fluids in rock pores or pore pressure (Pp) 302, the weight of the overburden or vertical stress (Sv) 304, the minimum effective horizontal stress (Sh) 306, and the maximum effective horizontal stress (SH) 308. The mechanical earth model 300 also includes the principal stress directions 310 such as, for example, the azimuths of the stresses Sh and SH. In addition, the mechanical earth model 300 includes rock mechanical properties such as rock compressional and tensile strength 312, Poisson's ratio, Young's modulus (i.e., the static elastic properties of the rock), friction angle, etc.

Figure 4:
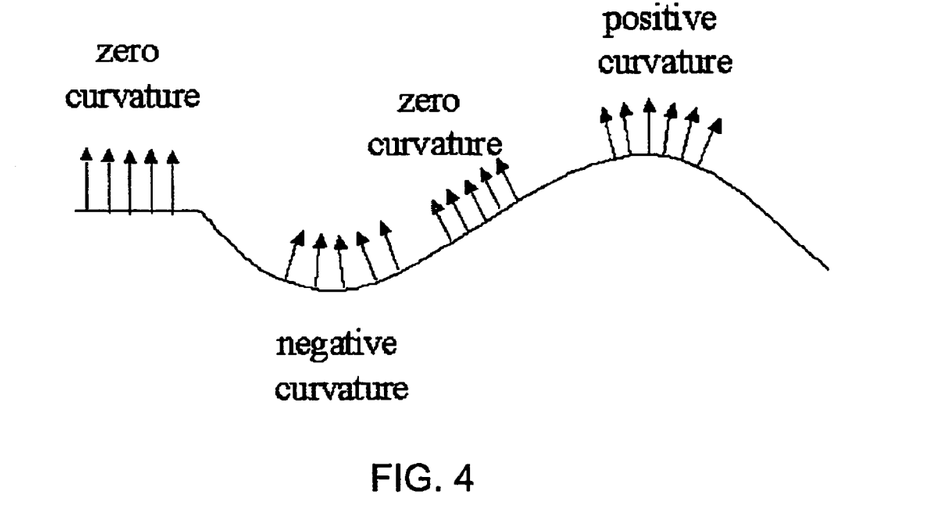
FIG. 4 represents an example curvature of a productive layer of a reservoir.

Returning again to FIG. 1, following determination of the rock mechanical and stress properties at block 104, the example process 100 determines the formation and horizon curvature from seismic or horizon properties over productive layers (block 106). Curvature is the rate of change of angle along a surface (e.g., time or depth) with respect to normal vectors along the surface. FIG. 4 depicts an example curved surface and the sign convention for curvature. In particular, FIG. 4 illustrates regions of zero curvature, negative curvature, and positive curvature. Curvature of a three dimensional surface (such as one bounding a hydrocarbon zone associated with a well) is related to stress (assuming buckling) as set forth in Equation 1 below, where the constant of proportionality can be determined using well, seismic, and stress information in the area.

$$\text{Stress} \propto \frac{h \times K \times E}{2} \qquad \text{Equation 1}$$

where $h$ = Layer Thickness $K$ = Layer or Horizon Curvature $E$ = Young's Modulus Referring again to FIG. 1, following the formation and horizon curvature determination at block 106, the example prediction process 100 determines the hydraulic fracture characteristics associated with the existing well location under analysis (e.g., an operational well) (block 108). More specifically, at block 108, microseismic event data, which may be collected during hydraulic fracture stimulation of the existing well location, may be used to determine hydraulic fracture orientation, hydraulic fracture volume, hydraulic fracture aspect ratios, as well as any other desired hydraulic fracture characteristics.

To determine the hydraulic fracture volume at block 108, a discrete pair-wise linear interpolation approach may be used. One particularly useful discrete pair-wise linear interpolation process is outlined below in detail. However, before providing a more detailed description of the manner in which this linear interpolation process may be carried out, a more general discussion of the operation of the process is provided to facilitate an understanding of the detailed example mathematical operations that may be used to implement the processes associated with block 108.

Generally, the example process for estimating or determining hydraulic fracture volume at block 108 is based on the assumption that microseismic events occurring near in time to the initiation of a hydraulic fracture stimulation are spatially closer to the source of the fracture than those microseismic events occurring relatively later in time from the initiation of the stimulation. In other words, for any set of microseismic data, the data is generally assumed to be temporally and spatially correlated such that data occurring later in time are more spatially distant from the source. Of course, in practice, some data may not conform perfectly to the assumed spatial/ temporal correlation. However, such non-conforming data would have or could be made to have minimal, if any, effect on the resultant fracture volume estimate. For example, data deemed to be non-compliant or otherwise aberrant could be eliminated from consideration, processing, etc.

Given the assumed spatial/temporal correlation of the microseismic data to be processed, the data is initially received in a time ordered list such that data that is adjacent in the list is also temporally (and assumed to be spatially) adjacent. The list of data is then traversed to determine the minimum and maximum x, y, and z axis coordinates, which are in turn used to compute the maximum dimensions of a three dimensional space occupied by the microseismic data. The three dimensional space is then voxelized using a desired resolution (i.e., voxel size) and may be represented using one or more data arrays and/or any other suitable data structure or construct. The use of such a data structure (e.g., data arrays) enables the voxelized space to be represented and stored in a computer memory and/or any other type of computer readable medium.

After having established the voxelized space, the time ordered list of microseismic data is processed to enable voxels within the voxelized space to be infilled, marked, tagged, or otherwise identified as composing the fracture space. In general, this identification process involves iteratively processing the time ordered list of microseismic data to repeatedly select different pairs of data points that are sufficiently temporally and spatially correlated and infilling, tagging, etc. those voxels in the voxelized space corresponding to the data points themselves as well as the voxels lying along a vector joining the data points. Thus, by repeatedly selecting different pairs of points from the time ordered list and infilling, tagging, etc. those voxels corresponding to the original microseismic points themselves as well as the voxels lying along the vectors connecting those points, the voxelized space forms an infilled or tagged voxel volume, cloud, or space within the overall or total available voxelized space. This infilled or tagged voxel volume or space can then be associated with or may correspond to the fracture volume.

Although it is possible to pair every original microseismic point with every other such point during the above-described iterative process, the resulting volume of tagged voxels would substantially overestimate the actual volume of the associated fracture network. Thus, it is advantageous to limit the extent to which points may be paired, corresponding to the assumed ranges of spatial/temporal correlation over which the point pairings are assumed to be valid or meaningful. Thus, in the voxel infilling process described in greater detail below, pairs of points that are temporally spaced beyond a predetermined threshold (e.g., a temporal spacing selected by a user) are not subjected to the infilling or tagging process, and the points lying on the vector connecting these pairs of points are neither infilled nor tagged. Further, the example process below also recognizes that the degree of correlation between pairs of points may decay or decrease with increasing temporal separation. In particular, the example infilling process establishes a maximum radius or spatial correlation length may decrease with increasing temporal lag. A pair of points that falls within the maximum temporal lag threshold but for which the distance between the points exceeds the maximum radius or correlation length is not subjected to infilling or tagging.

Figure 5:
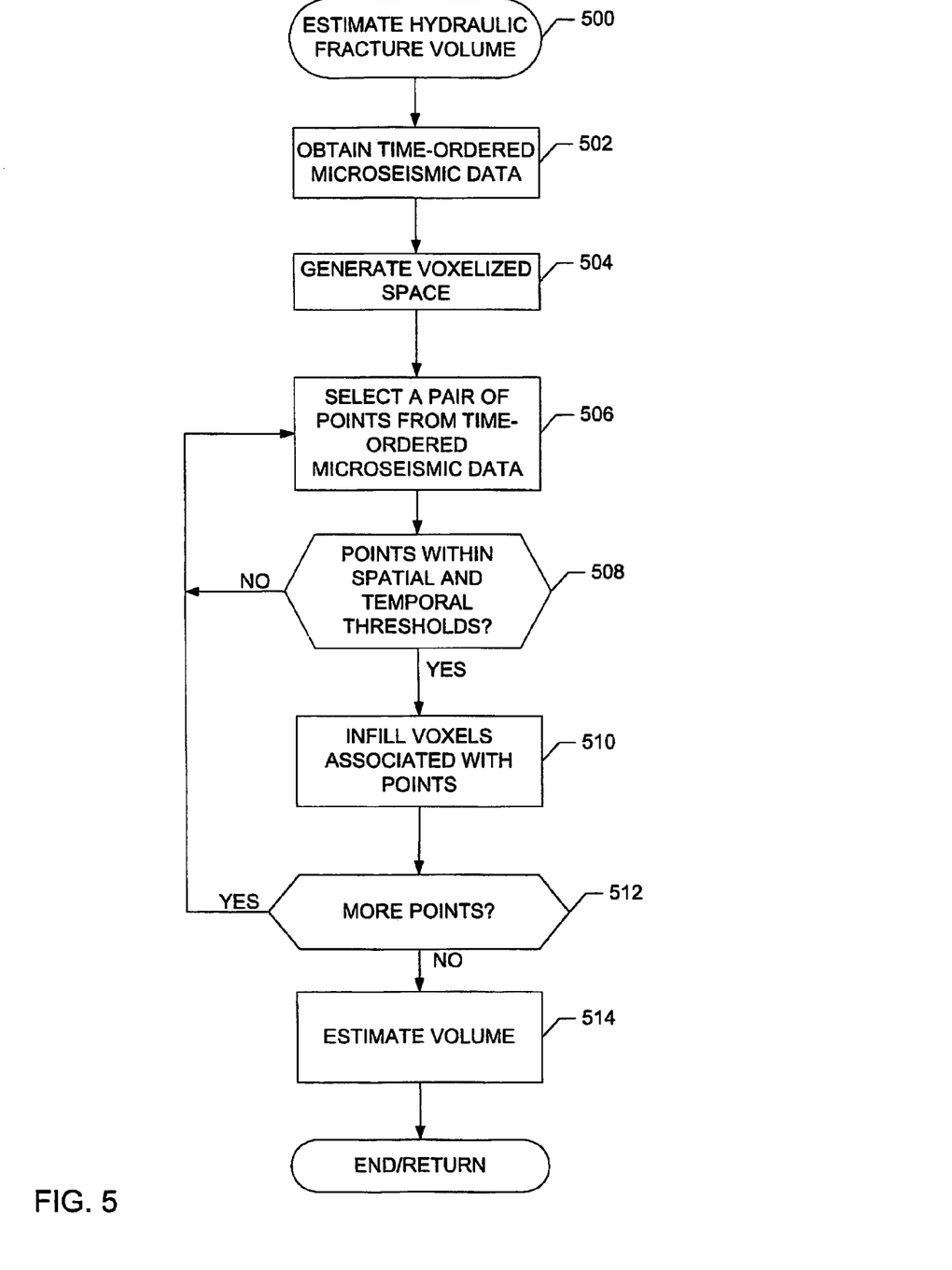
FIG. 5 is a flow diagram representing an example process to estimate a hydraulic fracture volume that may be used to determine hydraulic fracture characteristics in the example process of FIG. 1.

A flow diagram generally representing an example of the above-described process is provided in FIG. 5. The example process 500 for estimating a hydraulic fracture volume may be used to implement the example process of FIG. 1 and, in particular, the operations of block 108 shown therein. Turning in detail to FIG. 5, the example process obtains time ordered microseismic data (block 502). The time ordered microseismic data may be received in the form of a pre-processed list or one dimensional array of time ordered data. The list of time ordered data is then processed or examined to generate a voxelized space (block 504) to be used to hold data representing the fracture volume. In particular, as noted above, the voxelized space may be implemented as one or more three dimensional data arrays.

A pair of points is then selected from the time ordered microseismic data (block 506) and the points are evaluated to determine if they fall within predetermined spatial and temporal thresholds (block 508). If the points do not fall within the thresholds at block 508, the pair of points is not processed further and control returns to block 506 to select a different pair of points. If the points do fall within the thresholds at block 508, the voxels associated with the points are tagged, infilled, or otherwise identified or classified as composing a part of the fracture volume (block 510). The process 500 then determines if there are more point pairs to process (block 512). If there are more points to process at block 512, control is returned to block 506 to select a different pair of points. If there are no further points to process at block 512, the example process 500 may then evaluate the set of tagged, infilled, etc. voxels to estimate the volume of the fracture (block 514).

The following discussion provides a more detailed example of the above-described operations or processes for estimating hydraulic fracture volume. Initially, given N spatially and temporally correlated points, $P_n=[x_n, y_n, z_n, t_n]$ in ascending time (t) order, where n=1 to N, with associated discretization intervals $(\Delta x, \Delta y, \Delta z)>0$, additional points are generated using discretized linear interpolation between pairs of points $P_n$ and $P_{n-l}$ for l=1 to L, where L<N and L is subject to the constraints shown below.

$\Delta t < \Delta t_{max}$, $r < R_{max}$ and:

$\Delta t \equiv t_n - t_{n-l}$ $r \equiv [(x_n - x_{n-l})^2 + (y_n - y_{n-l})^2 + (z_n - z_{n-l})^2]^{1/2}$ The input points are then discretized by voxelizing them into a three-dimensional array. The entire list of points (i.e., the list of N points) is initially traversed to determine the numerical range of each coordinate ($x_{min}$, $x_{max}$, $y_{min}$, $y_{max}$, $z_{min}$, $z_{max}$). The dimensions of the three-dimensional array ($n_i$, $n_j$, $n_k$) are then determined as:

$n_i = (y_{max} - y_{min})/\Delta y + 1.5$ $n_j = (x_{max} - x_{min})/\Delta x + 1.5$ $n_k = (z_{max} - z_{min})/\Delta z + 1.5$ Two three-dimensional arrays are then allocated so that one of the arrays ($T_{ijk}$) is used to record the t coordinate values and the other array ($M_{ijk}$) is used to count the number of contributors to each voxel. After initializing both three-dimensional arrays to zero, each input point is voxelized by computing the indices i,j,k of the corresponding cell in the three-dimensional array then recording $t_n$ and the number of contributors. An example process by which the arrays can be zeroed and input points can be voxelized is set forth below.

```
for n=1 to N:
    T_ijk ← 0
    M_ijk ← 0
end for
for n=1 to N:
    i ← (y_n − y_min)/Δy + 0.5
    j ← (x_n − x_min)/Δx + 0.5
    k ← (z_n − z_min)/Δz + 0.5
    T_ijk ← T_ijk + t_n
    M_ijk ← M_ijk + 1
end for
```

If the voxel radius $(\Delta r \equiv \Delta x^2 + \Delta y^2 + \Delta z^2)^{1/2}$ exceeds the minimum distance between points, voxelization results in decimation and the total number of populated voxels, Np, is less than the total number of input points N. In this case, the array $T_{ijk}$ is normalized by dividing by the array $M_{ijk}$ and resetting $M_{ijk}$ to unity before interpolation is performed.

Following voxelization, interpolation is performed to infill voxels along the vector joining each pair of points. An arbitrary maximum lag (L) is selected (e.g., by a user) based on an assumed temporal correlation length ($\Delta t_{max}$) and an average time interval between points ($\Delta t$). For example, L may be selected based on the equation $L = N\Delta t_{max}/(t_N - t_1)$. A maximum radius ($R_{max}$), corresponding to lateral and vertical spatial correlation lengths is also assumed. Estimates of the temporal and spatial correlation lengths may be obtained by analyzing variograms generated using the microseismic data associated with the existing well location. Assuming that the degree of correlation between pairs of points decays with increasing temporal separation, the maximum radius may be modeled as a function of the lag (l). For example, $$r_{max}(l) = \frac{R}{l^q},$$

where q>0, yields a maximum radius which decreases with increasing lag. A process by which the above-described interpolation may be performed is described below.

```
for l = 1 to L:
    r_max ← R_max/l^q
    for n= l+1 to N:
        x ← x_n − x_{n-l}
        y ← y_n − y_{n-l}
        z ← z_n − z_{n-l}
        r ← (x^2 + y^2 + z^2)^{1/2}
        if (r < r_max and t_n − t_{n-l} < Δt_max) then
            infill_voxels_between_pts (n, n-l)
        end if
    end for
end for
```

Voxel infilling is then performed via linear interpolation by iteratively stripping segments of length $\Delta r$ from the vector joining points n and n−1 as shown in the example process below.

```
begin infill_voxels_between_pts (n, n-1):
    x  ←  x_{n-1}
    y  ←  y_{n-1}              ⎫
    z  ←  z_{n-1}              ⎬  set P = P_{n-1}
    t  ←  t_{n-1}              ⎭
    r  ←  Δr/r                 }  set length fraction (0 < r ≤ 1)

while (r < 1):
        x     ←  x + r(x_n - x)                           ⎫
        y     ←  y + r(y_n - y)                           ⎬  interpolate a new point by
        z     ←  z + r(z_n - z)                           ⎬  shifting P closer to P_n a
        t     ←  t + r(t_n - t)                           ⎭      distance Δr
        r     ←  Δr/[(x_n - x)² + (y_n - y)² + (z_n - z)²]^{1/2}  } reset the length fraction
        i     ←  (y - y_min)/Δy + 0.5                     ⎫
        j     ←  (x - x_min)/Δx + 0.5                     ⎬  voxelize P
        k     ←  (z - z_min)/Δz + 0.5                     ⎭
        Tijk  ←  Tijk + t                                 }  record P in 3-D arrays
        Mijk  ←  Mijk + 1
    end while
end infill_voxels_between_pt
```

Following the determination of hydraulic fracture characteristics at block 108, the example process 100 compares the hydraulic fracture characteristics (e.g., hydraulic fracture volume, orientation, and/or aspect ratios) to the stress and seismic anisotropy characteristics (block 110) of a fracture or fracture network. In particular, at block 110, the example process 100 may compare the orientation and/or aspect ratio information to stress characteristics such as, for example, stress anisotropy and/or seismic anisotropy characteristics.

The aspect ratio of a fracture or fracture network is generally positively (and strongly) correlated to hydrocarbon production of that fracture or fracture network. Thus, as described below, analyses of microseismic information or data to determine the aspect ratio of an existing well may be advantageous when determining or generating a hydrocarbon production function or model for use in predicting the production of new well locations. Before turning to a more detailed discussion concerning the manner in which fracture aspect ratios can be determined using microseismic data, a general discussion concerning the general relationships between the anisotropy of in-situ stress fields, fracture aspect ratios, fracture growth, and fracture characteristics or type is provided in connection with FIGS. 6A and 6B.

Figures 6A, 6B:
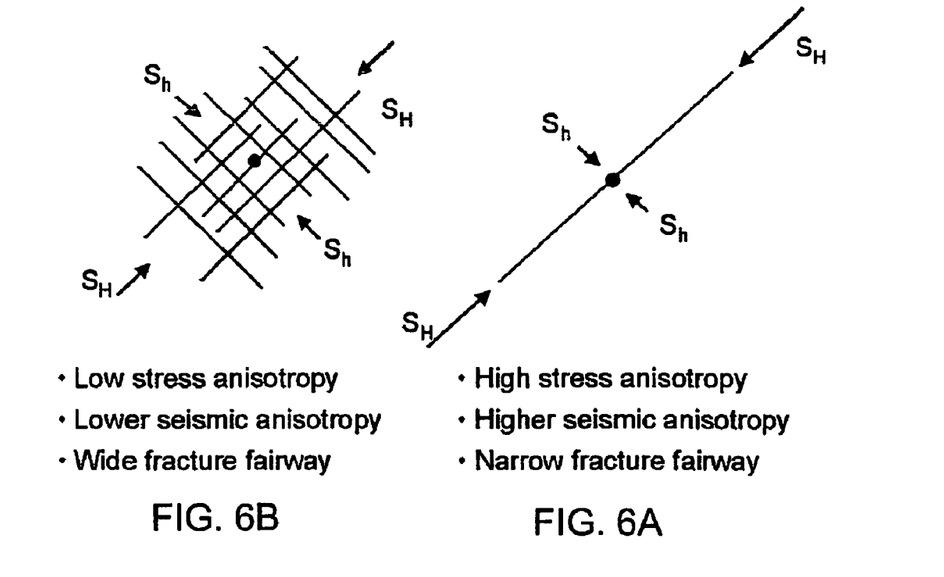
FIG. 6A is example representation of a fracture having a relatively high horizontal stress anisotropy.
FIG. 6B is an example representation of a fracture network having a relatively low horizontal stress anisotropy.

As can be seen from FIG. 6A, high stress (and seismic) anisotropy (e.g., the ratio Sh/SH is closer to zero) results in the growth of a substantially planar hydraulic fracture, which is commonly referred to as a classic hydraulic fracture. As depicted in FIG. 6A, in a classic hydraulic fracture, the stress Sh (i.e., the minimum horizontal stress) is substantially smaller than the stress SH (i.e., the maximum horizontal stress), which tends to result in fracture growth along the maximum stress direction in response to hydraulic fracturing stimulation. On the other hand, as shown in FIG. 6B, low stress (and seismic) anisotropy (e.g., the ratio of Sh/SH is closer to 1) typically results in a wide fracture fairway composed of a more dispersed network of intersecting fractures. Wide fracture fairways or fracture networks are generally advantageous (e.g., more productive) in low permeability reservoirs such as the well-known Barnett shale, for example, because there is more contact area between the multiple fractures and the hydrocarbon bearing rock than occurs for a substantially planar fracture. Thus, a well location having a relatively high Sh/SH ratio typically has a relatively high aspect ratio (i.e., width/length) and can be expected to provide a wide fracture network such as that shown in FIG. 6B and to yield a relatively high hydrocarbon production.

As a result of stress field anisotropy, hydraulic fractures do not grow isotropically, but instead have a preferred orientation and width. Hydraulic fracture width corresponds generally to the area of contact between the fracture and the formation, while the fracture orientation is generally a function of the principal stress directions acting on the fracture. The orientation and width of a hydraulic fracture may be computed using the radius of gyration matrix defined as shown below.

$$R = \begin{pmatrix} R_{11} & R_{12} & R_{13} \\ R_{21} & R_{22} & R_{23} \\ R_{31} & R_{32} & R_{33} \end{pmatrix}$$

where $$R_{ij} = \frac{1}{N} \sum_{k=1}^{N} \left( r_i^{(k)} - \bar{r}_i^{(k)} \right)\left( r_j^{(k)} - \bar{r}_j^{(k)} \right).$$

In the above computation, N represents the number of microseismic events recorded during the monitoring of the hydrofracture growth, $r_i^{(k)}$ is the ith component of the position vector of the kth microseismic event, and $r_i^{-(k)}$ is the mean value of $r_i^{(k)}$ averaged over all the microseismic events and is the ith component of the position vector of the center of gravity of the microseismic cloud. The square roots of the eigenvalues of R are the principal radii of gyration and may be considered as the principal axes (i.e., the width, length, and height) of an ellipsoid describing the shape of the microseismic cloud. The eigenvectors of R define the directions of principal axes of the microseismic cloud and can be used to determine the direction of the principal stress directions and the principal axes of the seismic anisotropy. Typically, one of the principal axes is substantially vertical, and the eigenvalues will be denoted by $\lambda V$, $\lambda H$ and $\lambda h$, where $\lambda V$ is the vertical eigenvalue, $\lambda H$ is the largest horizontal eigenvalue, and $\lambda h$ is the smallest horizontal eigenvalue. The aspect ratio ($\alpha$) of the microseismic cloud is then defined as square root of the smallest horizontal eigenvalue divided by the largest horizontal eigenvalue, and is equal to $\alpha=(\lambda_h/\lambda_H)^{1/2}$ and defines the width of the fracture fairway in terms of its length and the magnitude of the seismic anisotropy, which decreases with increasing aspect ratio. A second aspect ratio $\beta=(\lambda_v/\lambda_H)^{1/2}$ may be computed and is related to the vertical extent of the hydrofracture and may be used to determine if the hydrofracture has stayed in zone.

This relationship can be calibrated (i.e. the single parameter p can be determined using, for example, the procedure or technique described in detail below in connection with FIG. 7) by calculating the ratio of the width to the length of the microseismic cloud at any location where Sh/SH is known (or estimated using, for example, three-dimensional seismic data for azimuthal anisotropy) and the rock is approximately azimuthally isotropic such as, for example, in a region with small fracture density or low curvature. The aspect ratio of any microseismic cloud at any location where a well has not yet been drilled, but at which Sh/SH can be estimated, can then be predicted so that this estimate can be used to estimate the volume of the microseismic cloud before the well is drilled. It should be noted that this method can also be used to estimate the maximum horizontal stress at the location of a hydraulic fracture by combining the aspect ratio of the microseismic cloud with the minimum horizontal stress at that location according to the above equation.

The operations associated with blocks 102-110 may be carried out for one or more wells for which actual hydrocarbon production is known. The one or more wells may be associated with a particular geological area (e.g., a basin) for which the hydrocarbon production of a new (i.e., to be drilled) well location is to be estimated or predicted. In this manner, as described in greater detail below, an equation or model relating (e.g., fitting) the data or information determined at blocks 102-110 can be based on a more statistically significant data set and, thus, may enable more accurate predictions of the hydrocarbon production of a new well location within the same geological area or a geologically similar area.

In particular, the data or information determined at blocks 102-110 may be related to the actual hydrocarbon production (block 112) for each of the existing well locations analyzed at blocks 102-110. As represented below, using rock properties, petrophysical properties, reservoir curvature, along with the microseismic orientation, volume, and aspect ratios computed using the microseismic events, a correlation can be determined relating the properties to the hydrocarbon production such that:

Hydrocarbon production=f(HIP, Sh, SH, Curvature, MSV, aspect ratio)
  where
  HIP=hydrocarbon in place
  Sh=minimum horizontal stress
  SH=maximum horizontal stress
  Curvature=productive formation surface curvature
  MSV=microseismic fracture volume
  aspect ratio=aspect ratio of microseismic cloud The correlation or relation of the above-noted parameters will vary depending on the particular characteristics of a geological area (e.g., a basin) being analyzed. Each of the parameters or properties above may, for example, be determined for one or more wells in a particular geological area for which hydrocarbon production is known. Using the parameter values for each of the wells together with the known hydrocarbon production of these wells, a best correlation of the parameters of interest (e.g., those noted above) can be determined at block 112 using one of several data fitting methods or techniques. For example, a least squares, weighted average, linear regression, or any other suitable data fitting technique may be used to find an optimal fit of the data to a function. However, it should be noted that the hydrocarbon function or model described above is one example function or model and that fewer parameters and/or additional parameters may be used to generate the function or model.

There also exists a relationship (material balance) between the mechanical/stress properties and microseismic fracture volume such that MSV=f (Sh, SH, Curvature, volume of fracture fluid). Thus, development of this relationship using the techniques described herein provides another manner in which the MSV parameter may be calculated for a new well location (e.g. a location to be drilled). The MSV can also be estimated at any location where Sh/SH is known or can be estimated (e.g., via analysis of three-dimensional seismic data for azimuthal anisotropy) using, for example, the technique described below in connection with FIG. 7.

After determining or generating a hydrocarbon production function or model associated with a particular geological area (e.g., a basin) at block 112, the example process 100 uses the hydrocarbon production function or model developed at block 112 to predict the hydrocarbon production of a new well location (e.g., a location that may be drilled) (block 114). More specifically, values for each of the parameters composing the function or model are determined for the new well location and a predicted hydrocarbon production is computed. For the example function or model provided above, values for HIP, Sh, SH, curvature, MSV, and aspect ratio ($\alpha$) may be determined for the new well location and used with the previously generated hydrocarbon production function or model (i.e., the function or model generated at block 112) to compute the predicted hydrocarbon production (block 114).

As noted above, the aspect ratio of a new well location (e.g., a well location to be drilled) can be determined using more easily obtainable stress data as opposed to microseismic information. Specifically, the ratio of minimum and maximum horizontal stress (i.e., Sh/SH) may be related to the aspect ratio $\alpha$. In particular, this relationship can be expressed generally as $\alpha=(S_h/S_H)^p$, where p is characteristic of a particular geological area.

Figure 7:
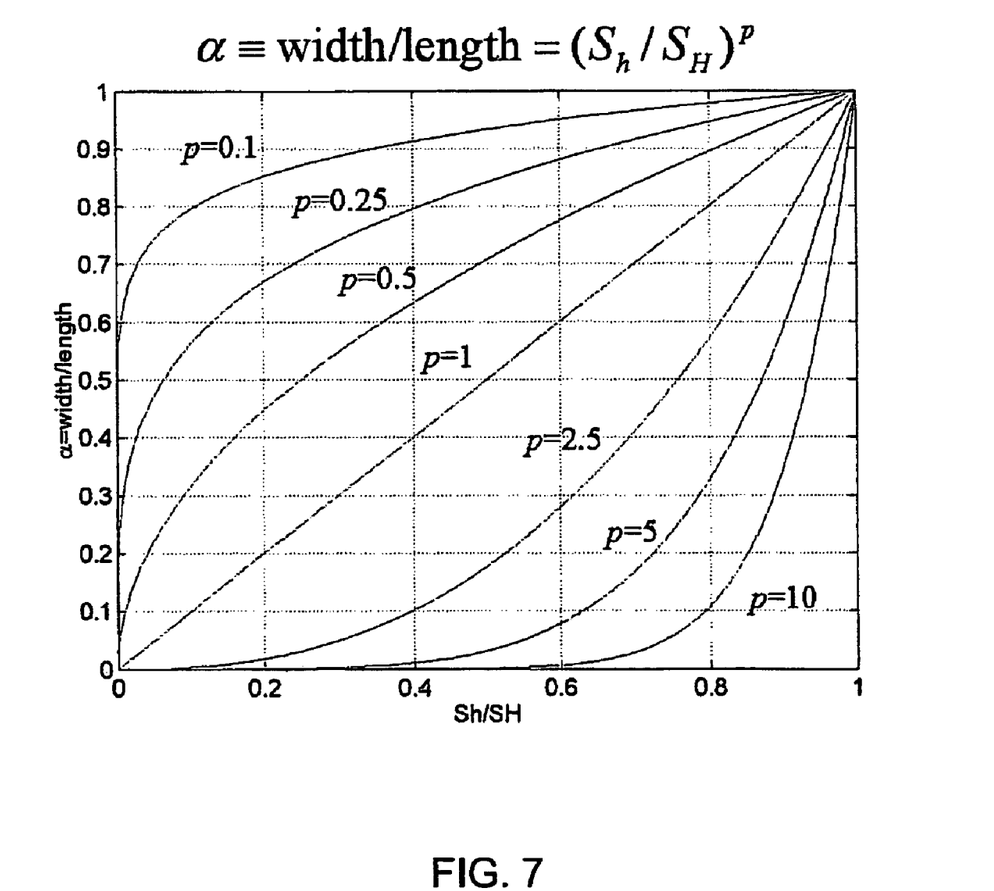
FIG. 7 is an example graphical depiction of a relationship between the horizontal stress characteristics of a fracture and the aspect ratio of the fracture.

FIG. 7 is an example graph including a family curves illustrating the relationship between the stress ratio and aspect ratio for different p values. To predict, estimate, or determine the aspect ratio for a new well location (e.g., a location to be drilled), the actual stress data and aspect ratio information associated with existing well locations (e.g., information collected at blocks 108 and 110 of the process 100) is used to determine which of the family of curves best represents the geological area (e.g., a basin or field). After the curve representative of the geological area is selected from the family of curves shown in FIG. 7, stress data (i.e., Sh and SH) for the new well location (e.g., the location to be drilled) are estimated or measured. The ratio Sh/SH is then calculated and mapped to the selected curve to determine an estimated aspect ratio. For example, if the ratio Sh/SH for a new well location is determined to be 0.8 and the p value associated with that location is determined to be 0.5, then using the example graph of FIG. 7, the estimated or predicted aspect ratio for the new location is about 0.9. The estimated aspect ratio can then be used (along with values for the other parameters) when computing the predicted production for the new well location using the production equation or model developed at block 112 of FIG. 1.

Figure 8:
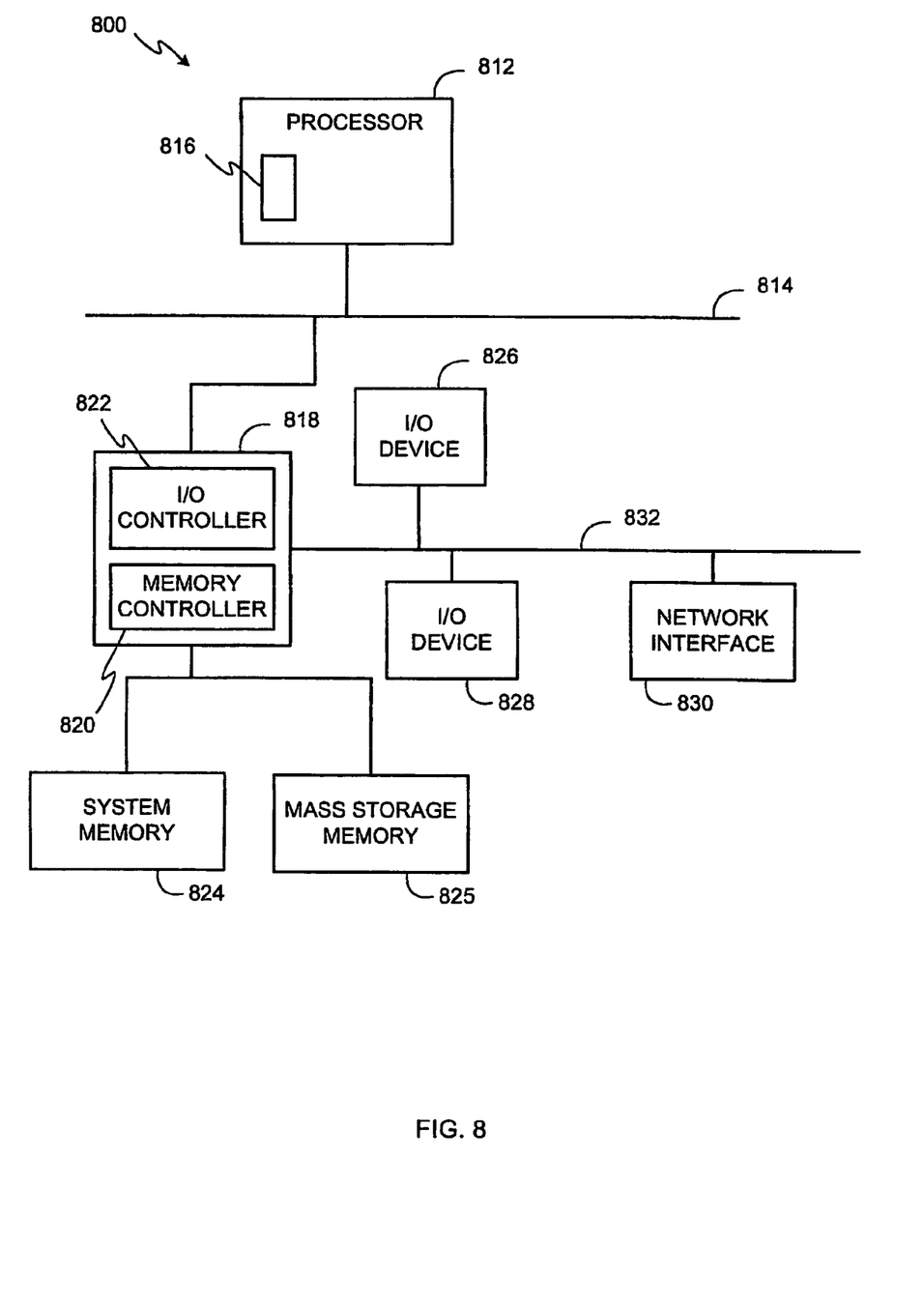
FIG. 8 is an example processor system that may be used to execute machine readable instructions to implement the example systems and methods described herein.

FIG. 8 is a block diagram of an example processor system that may be used to implement the systems and methods described herein. As shown in FIG. 8, the processor system 800 includes a processor 812 that is coupled to an interconnection bus 814. The processor 812 includes a register set or register space 816, which is depicted in FIG. 8 as being entirely on-chip, but which could alternatively be located entirely or partially off-chip and directly coupled to the processor 812 via dedicated electrical connections and/or via the interconnection bus 814. The processor 812 may be any suitable processor, processing unit or microprocessor. Although not shown in FIG. 8, the system 800 may be a multi-processor system and, thus, may include one or more additional processors that are identical or similar to the processor 812 and that are communicatively coupled to the interconnection bus 814.

The processor 812 of FIG. 8 is coupled to a chipset 818, which includes a memory controller 820 and an input/output (I/O) controller 822. As is well known, a chipset typically provides I/O and memory management functions as well as a plurality of general purpose and/or special purpose registers, timers, etc. that are accessible to and/or used by one or more processors coupled to the chipset 818. The memory controller 820 performs functions that enable the processor 812 (or processors if there are multiple processors) to access a system memory 824 and a mass storage memory 825.

The system memory 824 may include any desired type of volatile and/or non-volatile memory such as, for example, static random access memory (SRAM), dynamic random access memory (DRAM), flash memory, read-only memory (ROM), etc. The mass storage memory 825 may include any desired type of mass storage device including hard disk drives, optical drives, tape storage devices, etc.

The I/O controller 822 performs functions that enable the processor 812 to communicate with peripheral input/output (I/O) devices 826 and 828 and a network interface 830 via an I/O bus 832. The I/O devices 826 and 828 may be any desired type of I/O device such as, for example, a keyboard, a video display or monitor, a mouse, etc. The network interface 830 may be, for example, an Ethernet device, an asynchronous transfer mode (ATM) device, an 802.11 device, a DSL modem, a cable modem, a cellular modem, etc. that enables the processor system 800 to communicate with another processor system.

While the memory controller 820 and the I/O controller 822 are depicted in FIG. 8 as separate functional blocks within the chipset 818, the functions performed by these blocks may be integrated within a single semiconductor circuit or may be implemented using two or more separate integrated circuits.

What is claimed is:

1. A method of predicting a hydrocarbon production of a well location, comprising:
   generating a hydrocarbon production function based on information associated with at least a first well location, wherein generating the hydrocarbon production function comprises relating a hydrocarbon production value to an aspect ratio of the first well location, and wherein the aspect ratio of the first well location is determined by computing at least one radius of gyration;
   obtaining information associated with a second well location, wherein the information associated with the second well location comprises stress information;
   using the stress information to estimate an aspect ratio of a fracture associated with the second well location; and
   calculating the hydrocarbon production function using the information associated with the second well location to predict the hydrocarbon production of the second well location, wherein the information associated with the second well location further comprises the estimated aspect ratio of the fracture.

2. A method as defined in claim 1, wherein the information associated with the at least first well location comprises at least one of microseismic data, seismic data, and log data.

3. A method as defined in claim 1, wherein the information associated with the at least first well location comprises information generated via an earth model or an elemental log analysis.

4. A method as defined in claim 1, wherein the information associated with the second well location comprises at least one of microseismic data, seismic data, and log data.

5. A method as defined in claim 1, wherein using the stress information associated with the second well location to estimate the aspect ratio of the fracture comprises calculating a stress ratio and using the stress ratio to estimate the aspect ratio of the fracture.

6. A method as defined in claim 5, wherein calculating the hydrocarbon production function using the information associated with the second well location to predict the hydrocarbon production of the second well location comprises calculating the hydrocarbon production function using the estimated aspect ratio.

7. A method as defined in claim 1, wherein generating the hydrocarbon production function further comprises determining at least one of rock petrophysical properties, rock mechanical properties, stress, and formation and horizon curvature.

8. A method as defined in claim 1 further comprising generating the hydrocarbon production function based on information associated with a plurality of well locations.

9. A method as defined in claim 1, wherein the information associated with the second well location further comprises at least one of a hydrocarbon in place parameter, a horizontal stress parameter, a reservoir curvature, and a fracture volume.

10. A method as defined in claim 1, wherein the first and second well locations are associated with a single geological area.

11. method as defined in claim 1, wherein the first well location is an existing well location and the second well location is a well location to be drilled.

12. A system for predicting a hydrocarbon production of a well location, comprising:
    a memory and a processor coupled to the memory, wherein the processor is programmed to:
    generate a hydrocarbon production function based on information associated with at least a first well location, wherein generating the hydrocarbon production function comprises relating a hydrocarbon production value to an aspect ratio of the first well location, and wherein the aspect ratio of the first well location is determined by computing at least one radius of gyration;
    obtain information associated with a second well location, wherein the information associated with the second well location comprises stress information;
    use the stress information to estimate an aspect ratio of a fracture associated with the second well location; and
    calculate the hydrocarbon production function using the information associated with the second well location to predict the hydrocarbon production of the second well location, wherein the information associated with the second well location further comprises the estimated aspect ratio of the fracture.

13. A system as defined in claim 12, wherein the information associated with the at least first well location comprises at least one of microseismic data, seismic data, and log data.

14. A system as defined in claim 12, wherein the information associated with the at least first well location comprises information generated via an earth model or an elemental log analysis.

15. A system as defined in claim 12, wherein the information associated with the second well location comprises at least one of microseismic data, seismic data, and log data.

16. A system as defined in claim 12, wherein the processor is programmed to estimate the aspect ratio of the fracture by calculating a stress ratio and using the stress ratio to estimate the aspect ratio of the fracture.

17. A system as defined in claim 16, wherein the processor is programmed to predict the hydrocarbon production of the second well location by calculating the hydrocarbon production function using the estimated aspect ratio.

18. A system as defined in claim 12, wherein the processor is further programmed to generate the hydrocarbon production function by determining at least one of rock petrophysical properties, rock mechanical properties, stress, and formation and horizon curvature.

19. A system as defined in claim 12, wherein the processor is programmed to generate the hydrocarbon production function based on information associated with a plurality of well locations.

20. A system as defined in claim 12, wherein the information associated with the second well location further comprises at least one of a hydrocarbon in place parameter, a horizontal stress parameter, a reservoir curvature, and a fracture volume.

21. A system as defined in claim 12, wherein the first well location is an existing well location and the second well location is a well location to be drilled.

22. A machine readable medium having instruction stored thereon that, when executed, cause a machine to:
generate a hydrocarbon production function based on information associated with at least a first well location by relating a hydrocarbon production value to an aspect ratio of the first well location, wherein the aspect ratio of the first well location is determined by computing at least one radius of gyration;
obtaining information associated with a second well location, wherein the information associated with the second well location comprises stress information;
using the stress information to estimate an aspect ratio of a fracture associated with the second well location; and
calculate the hydrocarbon production function using the information associated with the second well location to predict the hydrocarbon production of the second well location, wherein the information associated with the second well location further comprises the estimated aspect ratio of the fracture.

23. A method of predicting a hydrocarbon production of a well location, comprising:
generating a hydrocarbon production function based on information associated with at least a first well location, wherein generating the hydrocarbon production function comprises relating a hydrocarbon production value to a fracture volume, and wherein the fracture volume is estimated using spatially and temporally correlated microseismic data represented in a three dimensional space;
obtaining information associated with a second well location, wherein the information associated with the second well location comprises stress information;
using the stress information to estimate an aspect ratio of a fracture associated with the second well location; and
calculating the hydrocarbon production function using the information associated with the second well location to predict the hydrocarbon production of the second well location, wherein the information associated with the second well location further comprises the estimated aspect ratio of the fracture.

24. A system for predicting a hydrocarbon production of a well location, comprising:
a memory and a processor coupled to the memory, wherein the processor is programmed to:
generate a hydrocarbon production function based on information associated with at least a first well location, wherein generating the hydrocarbon production function comprises relating a hydrocarbon production value to a fracture volume, and wherein the fracture volume is estimated using spatially and temporally correlated microseismic data represented in a three dimensional space;
obtain information associated with a second well location, wherein the information associated with the second well location comprises stress information;
use the stress information to estimate an aspect ratio of a fracture associated with the second well location; and
calculate the hydrocarbon production function using the information associated with the second well location to predict the hydrocarbon production of the second well location, wherein the information associated with the second well location further comprises the estimated aspect ratio of the fracture.

25. A machine readable medium having instruction stored thereon that, when executed, cause a machine to:
generate a hydrocarbon production function based on information associated with at least a first well location by relating a hydrocarbon production value to a fracture volume, wherein the fracture volume is estimated using spatially and temporally correlated microseismic data represented in a three dimensional space;
obtaining information associated with a second well location, wherein the information associated with the second well location comprises stress information;
using the stress information to estimate an aspect ratio of a fracture associated with the second well location; and
calculate the hydrocarbon production function using the information associated with the second well location to predict the hydrocarbon production of the second well location, wherein the information associated with the second well location further comprises the estimated aspect ratio of the fracture.

* * * * *